May 3, 1966 V. W. STIMMEL 3,249,820
CONTROL SYSTEM FOR PUNCH PRESSES AND SIMILAR MACHINES
Filed May 6, 1963
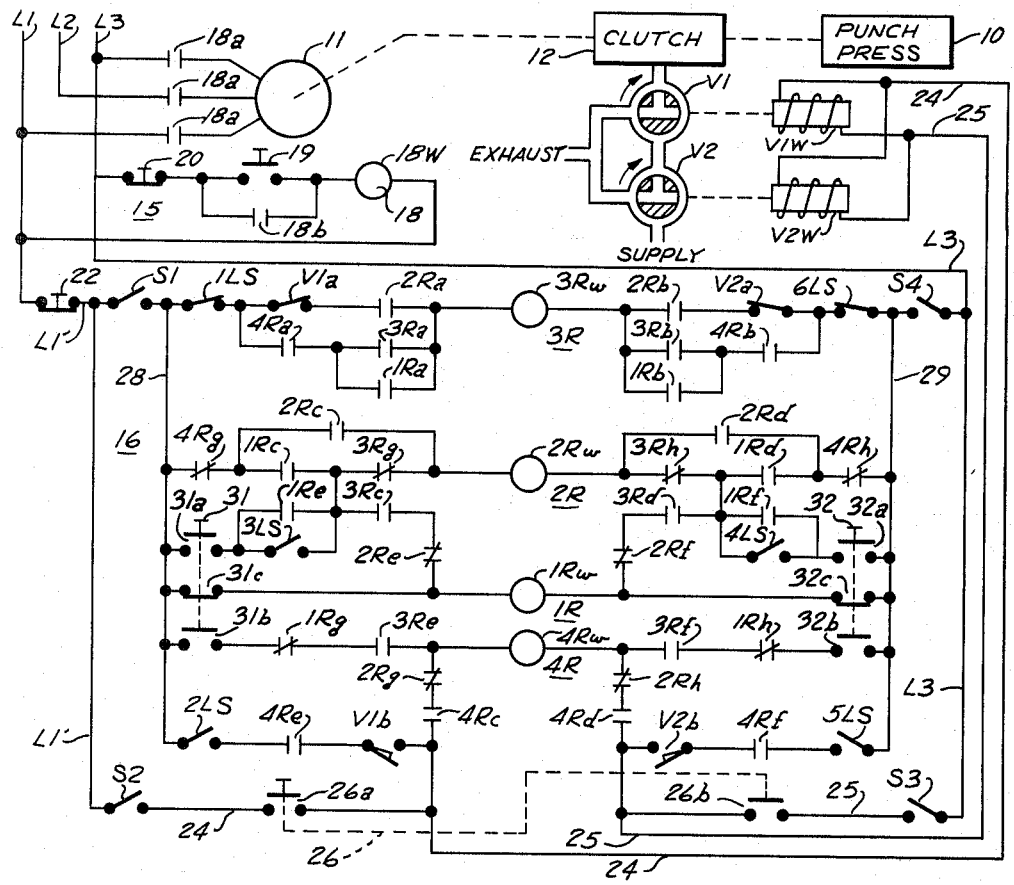
FIG. 1
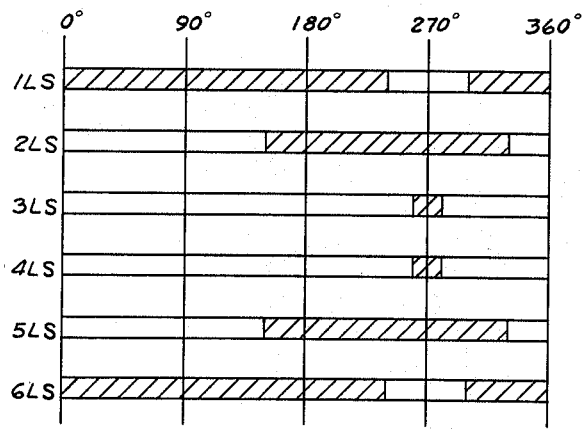
FIG. 3
|  | S1 | S2 | S3 | S4 |
|---|---|---|---|---|
| RUN | X |  |  | X |
| OFF |  |  |  |  |
| INCH |  | X | X |  |
FIG. 2
INVENTOR.
VINCENT W. STIMMEL
BY
Harold J. Rathbun
William H. Schmeling

United States Patent Office 3,249,820
Patented May 3, 1966

3,249,820
CONTROL SYSTEM FOR PUNCH PRESSES AND SIMILAR MACHINES
Vincent W. Stimmel, Shorewood, Wis., assignor to Square D Company, Park Ridge, Ill., a corporation of Michigan
Filed May 6, 1963, Ser. No. 278,137
6 Claims. (Cl. 317—123)

This invention relates to electric control systems, and more particularly to electric control systems for controlling the operation of punch presses and similar machines.

In electric control systems for machines having a part which reciprocates through a predetermined cycle, such as punch presses used for forming or piercing metal, it is important that the control system prevent either intentional or unintentional movement of the part for more than a single cycle if all of the components of the control system are not operating properly. Further, when punch presses are arranged to provide a single cycle of operation and then stop, the control system should so function that, regardless of any malfunction of any of the control system components, the press can make only one cycle of operation and not repeat inadvertently.

Punch presses for which a control system in accordance with this invention is particularly suitable include a clutch for intermittently transmitting power from a continuously operating electric motor to the driving shaft of the press and a brake to stop the driving shaft at the completion of a cycle of operation. The brake and the clutch, which may comprise separate units or may be combined into a single unit, are generally operated by compressed air controlled by an electromagnetically operated valve. The control system of the present invention includes means for controlling the operation of the valves in a manner to prevent a subsequent cycle of operation of the press if, during a previous cycle of operation, one or more of the components of the control system including the valve failed to function properly.

An object of this invention is to provide an improved control system for cyclically operating machines which insures that the machine will not make a subsequent cycle of operation if there has been a malfunction of the control system during the next preceding cycle.

Another object is to provide a system of interlocked electromagnetic relays and switches for controlling the energization of a clutch for a punch press so that the clutch cannot become engaged after an operating period of the press if one or more of the relays or valves failed to function as intended during that operating period.

Further objects and advantages of the invention will become apparent from the following description wherein reference is made to the accompanying drawings, in which:

FIG. 1 is an elementary wiring diagram of an embodiment of the invention;

FIG. 2 is a sequence chart for a selector switch of the control system of FIG. 1; and FIG. 3 is a diagrammatic developed representation of a rotating limit switch of the control system of FIG. 1.

Referring to FIG. 1, a punch press 10 is diagrammatically shown as arranged to be driven intermittently by a polyphase induction motor 11 through an air-operated clutch structure 12, which in addition to a clutch, may also include an air operated brake for stopping the press 10 and a flywheel. Operation of the clutch structure 12 may be controlled by a single valve but is preferably controlled by a pair of electromagnetically operated valves V1 and V2 having operating windings V1W and V2W. The motor 11 is arranged to be supplied from a power source indicated by the conductors L1, L2, and L3 which also, through the conductors L1 and L3, supplies power to a control system 15 for the motor 11 and to a control system 16 for the clutch 12.

In the motor control system, 15, a three-pole electromagnetic contactor 18 having a plurality of main contacts 18a and an operating winding 18w is arranged to connect and disconnect the motor 11 from the conductors L1, L2, and L3 in response to operation of a start push button 19 and a stop push button 20 which control the energization of the winding 18w. The start push button 19 is by-passed by a normally open auxiliary contact 18b of the contactor 18 to provide a conventional holding circuit for the contactor.

Referring now to the clutch control system 16, a normally-closed emergency stop push button 22 is interposed between the conductor L1 and a conductor L1' so that opening of the stop push button 22 completely deenergizes the control system 16 and prevents energization of the windings V1W and V2W or causes immediate deenergization thereof if it is energized.

Although usable with other systems of punch press control, the invention is illustrated as applied to a two-sided, underground system in which the various contacts of a selector switch, a limit switch, and a plurality of relays are duplicated and are inserted in the circuitry on both sides of the relay operating windings, and in which at least a pair of push buttons are used. This assures that an inadvertent ground will not cause a false operation of the press. It will be understood that a conventional ground detector may be provided to indicate the presence of an unintentional ground.

The clutch control system 16 has two different modes of operation determined by the selected position of a manually operated three-position selector switch having four contacts S1, S2, S3, and S4. As shown in the sequence chart of FIG. 2 wherein an X indicates a closed position of a contact, when the selector switch is in an OFF position, none of the contacts S1 through S4 is closed and, as will be apparent, no power can be applied to the clutch control system 16 or to the valves V1 and V2. When the selector switch is in an inch position, the contacts S1 and S4 are open and the contacts S2 and S3 are closed. The contacts S2 and S3, when closed, connect the pair of conductors L1' and L3 to a pair of conductors 24 and 25, respectively. A pair of normally-open contacts 26a and 26b of a double-pole inch push button 26 are interposed in the conductors 24 and 25, respectively, and when closed with the contacts S2 and S3 also closed complete a circuit from the conductors L1' and L3 through the conductors 24 and 25 to the windings V1W and V2W of the valves V1 and V2 thereby to supply operating air to the clutch structure 12 resulting in operation of the press 10. It will be understood that the inching circuitry just described is used only for set-up operations of the press 10 and that the protection provided by this invention is not available during inching operations.

The winding V1W which when energized causes the valve V1 to rotate in the direction indicated by an arrow also actuates a pair of switch contacts V1a and V1b causing contacts V1a to open and V1b to close. Similarly when the winding V2W is energized it causes valve V2 to rotate as indicated by an arrow and causes switch contacts V2a to open and V2b to close. The valves are connected in pneumatic series between a switchable pneumatic or hydraulic supply and the clutch so that when windings V1W and V2W are deenergized, both valves will be closed or in an exhaust position as shown. When the windings V1W and V2W are energized the valves V1 and V2 will rotate to an open position and connect the clutch to the supply.

When the selector switch is in a run position, the contacts S2 and S3 are open and the contacts S1 and S4 are closed and connect the pair of conductors L1′ and L3 to a pair of conductors 28 and 29, respectively. Control of the valves V1 and V2 of the clutch 12 can now be effected by the other components of the control system 16 in accordance with this invention.

In order to provide automatic switching at predetermined intervals during a cycle of operation of the press 10, a conventional cam-type rotary limit switch is provided having six contacts 1LS through 6LS. The limit switch is driven in the usual manner by the press 10 and makes one complete revolution or cycle of 360° while the press 10 operates through one complete cycle. As shown in the developed view of the limit switch in FIGURE 3 wherein cross-hatched areas indicate a closed condition of the associated contacts, only the contacts 1LS and 6LS are closed in the zero or at rest position. At about 150° of the complete cycle of 360°, the contacts 2LS and 5LS close. At about 240° of the cycle, the contacts 1LS and 6LS open, and at about 260° the contacts 3LS and 4LS close. At about 280° the contacts 3LS and 4LS re-open, and at about 300° the contacts 1LS and 6LS re-close. The contacts 2LS and 5LS re-open at about 330° so that at 360° or zero position only the contacts 1LS and 6LS of the limit switch are closed. It will be understood that these specific angular values are exemplary only and may be varied to suit particular operating conditions.

The control system 16 includes a pair of manually operable run push buttons or switches 31 and 32. The run push button 31 has normally open contacts 31a and 31b and normally closed contacts 31c. Similarly, the run push button 32 has normally open contacts 32a and 32b and normally closed contacts 32c.

In order to control the valves V1 and V2 and, hence, the clutch structure 12, upon operation of the run push buttons 31 and 32, a plurality of electromagnetically operated relays 1R, 2R, 3R, and 4R having operating windings 1Rw, 2Rw, 3Rw, and 4Rw, respectively, are provided. These relays are so arranged and electrically interlocked in a switching network in accordance with this invention so that, if any one of the relays should fail to operate in the correct sequence, or properly during a cycle of operation of the press 10, the valves V1 and V2 cannot be re-energized to provide another cycle of operation.

The relay 1R has six normally open contacts 1Ra through 1Rf and two normally closed contacts 1Rg and 1Rh. Similarly, the relay 3R has six normally open contacts 3Ra through 3Rf and two normally closed contacts 3Rg and 3Rh. The relay 4R also has six normally open contacts 4Ra through 4Rf and two normally closed contacts 4Rg and 4Rh. The relay 2R has four normally open contacts 2Ra through 2Rd and four normally closed contacts 2Re through 2Rh.

Further understanding of the control system of FIG. 1 will be obtained from a consideration of its normal automatic operation. It will be assumed that power is available at the conductors L1, L2, and L3, that the contactor 18 is closed causing the motor 11 to rotate, and that the motor 11 is disconnected from the press 10 by the clutch of the clutch structure 12. With the selector switch in the run position, the contacts S1 and S4 are closed connecting the conductors 28 and 29 to the conductors L1′ and L3 respectively. It is apparent, without detailed tracing of the circuitry through the conductors 28 and 29, that the windings 1Rw, 2Rw, 3Rw, and 4Rw are arranged to be connected for energization through the switching network from the conductors 28 and 29 by selective operation of various relay, push button, valve switch contacts and limit switch contacts. To simplify the description, reference will be made to operation of the relay contacts and switch contacts that are interposed between the conductor 28 and the several relay windings, it being understood that the corresponding relay and switch contacts that are interposed between the conductor 29 and the several relay windings will operate concurrently.

With power available at the conductors 28 and 29 and the run push buttons 31 and 32 in their unoperated or released positions, as shown, the winding 1Rw of the relay 1R is energized through the normally closed contacts 31c and 32c. Consequent pick-up of the relay 1R causes closure of the contacts 1Ra, 1Rc, and 1Re, and opening of the contacts 1Rg. The operation of the contacts 1Ra, 1Rd, and 1Rg is of no effect at this time, but closure of the contacts 1Rc causes energization of the winding 2Rw of the relay 2R and the relay 2R picks up and completes a holding circuit for itself through the contacts 2Rc against the subsequent opening of the contacts 1Rc or 3Rg. Opening of the contacts 2Re and 2Rg is of no effect at this time. Closure of the contacts 2Ra, however, causes energization of the winding 3Rw of the relay 3R and consequent pick-up of the relay 3R sets up but does not complete an energizing circuit for the winding 4Rw of the relay 4R by closure of the contacts 3Re. Closure of the contacts 3Ra and 3Rc and opening of the contacts 3Rg are of no effect at this time. Each of the relays 1R, 2R, and 3R is now picked up and the relay 4R is still in its normal or dropped out position.

It should be noted that operation of either one, but not both, of the run push buttons 31 and 32 at this time would deenergize the winding 1Rw by opening of the contacts 31c or 32c and that consequent drop-out of the relay 1R would close the normally closed contacts 1Rg to set up but not complete an energizing circuit for the winding 4Rw. The circuit for the winding 4Rw would not be completed because one or the other of the contacts 31b and 32b would be open. The winding 3Rw would remain energized through the contacts 2Ra and the winding 2Rw would remain energized through the contacts 2Rc.

When both run push buttons 31 and 32 are simultaneously operated to cause the contacts 31c and 32c to open, the relay winding 1Rw is deenergized as contacts 2Re are also open, closing of the contacts 31b and 32b causes the winding 4Rw to be energized in turn causing, by opening of the normally-closed contacts 4Rg, deenergization of the winding 2Rw and providing, through the now-closed contacts 4Ra, a holding circuit for the winding 3Rw. Closure of the contacts 4Re is of no effect at this time, but closure of the contacts 4Rc sets up a circuit which is immediately completed by closure of the contacts 2Rg to energize the valve windings V1W and V2W causing contacts V1a and V2a to open and V1b and V2b to close and the clutch structure 12 to operate to in turn cause the press 10 to start a cycle of operation. The energizing circuit for the valve windings V1W and V2W is through the contacts 31b, 1Rg, 3Re, 2Rg, and 4Rc. It should be noted that before the press 10 starts, each of the relays 1R, 2R, 3R, and 4R had to pick up in turn and the relays 1R and 2R, in addition, had to drop out.

When the press 10 reaches the 150° position of its cycle, the limit switch contacts 2LS close to complete circuits which by-pass the contacts 31b and 32b of the push buttons. The push buttons 31 and 32 may now be released and the press 10 will continue to operate. The relay 1R picks up upon release of the push buttons 31 and 32, but has no immediate effect, the valve windings V1W and V2W remaining energized through a circuit including the contacts 2LS, 4Re and V1b and V2b.

At about 240° of the press operating cycle, the limit switch contacts 1LS open and, at about 300° of the cycle, reclose. This is to provide a checking circuit which will be described. A further checking circuit is completed by closure of the limit switch contacts 3LS between 260° and 280° of the cycle.

At about 330° of the cycle of press operation, the limit switch contacts 2LS open to deenergize the windings V1W and V2W which causes the press 10 to stop at the 360° or zero degree position. The winding 4Rw is also deenergized to cause drop-out of the relay 4R when the contacts 2LS open. Opening of the contacts 4Ra upon drop-out of the relay 4R causes drop-out of the relay 3R and closure of the contacts 3Rg causes the relay 2R to pick up. Pick-up of the relay 2R causes pick-up of the relay 3R through the contacts 2Ra. With the relays 1R, 2R, and 3R picked up, the system is ready for another cycle of operation of the press 10 which will start upon operation of the push buttons 31 and 32.

The operation of the press 10 has been described for a complete cycle under the assumption made that all of the relays and valves operate properly. Consideration will now be given to the consequences of a failure of the relays or valves to operate as intended.

If the relay 4R should drop out for any reason during operation of the press 10, opening of the contacts 4Rc and 4Re would cause the press to stop and opening of the contacts 4Ra in the holding circuit for the relay 3R would cause the relay 3R to drop out, making it necessary to release both of the pushbuttons 31 and 32, if they had not been released, and then to deliberately reclose them in order to restart the press 10.

If the circuit for the winding 1Rw were open or the relay 1R did not move to its picked-up position for any reason, the consequent failure of the contacts 1Rc to close would prevent pick-up of the relay 2R. If the relay 2R does not pick up for any reason, the failure of the contacts 2Ra to close prevents the winding 3Rw from being energized. If the winding 3Rw is not energized or the relay 3R does not pick up for any other reason, the winding 4Rw does not become energized through the contacts 3Re and the windings V1W and V2W would not become energized. Further, if the relay 4R failed to pick up, the open circuit at the contacts 4Rc would prevent the windings V1W and V2W from being energized. It is thus seen that if any one or more of the relays 1R, 2R, 3R, or 4R fail to move to their operated position during an operating cycle, the valve windings V1W and V2W will not be energized and the press will not start.

The other possible failure of the relays is that they might remain in their picked-up positions when their windings are de-energized. If the relay 1R remains picked up, the then open contacts 1Rg make it impossible to energize the winding 4Rw and thus the windings V1W and V2W cannot be energized. If relay 2R remains picked up, the contacts 2Rg remain open and the windings V1W and V2W cannot be energized. If the relay 3R fails to drop out when intended, the contacts 3Rc maintain the relay 1R picked up and the winding 4Rw will not become energized so that the windings V1W and V2W will not become energized. If the relay 4R remains in its picked-up position, the relay 2R will not energize for the next cycle and the windings V1W and V2W cannot be energized.

When the limit switch contacts 1LS open at 240° of cycle, the relay 3R should drop out. If it does not, then when the contacts 3LS close at 260° of the cycle, the relay 1R will pick up if the pushbutton 31 is not released, and will be held in through the contacts 1Re to prevent a subsequent cycle of press operation. When the limit switch contacts 1LS reclose, the relay 3R should pick up again to provide normal operation. Thus, the parallel circuit through the limit switch contact 3LS and the contact 1Re is provided to protect against the possibility that the relay 3R will remain in its picked-up position and the push buttons 31 and 32 are not opened during the cycle. When the limit switch contacts 3LS close with the relay 3R in its picked-up position, the relay 1R would pick up to stop the press 10 if the push buttons 31 and 32 had not been released to cause pick-up of the relay 1R.

If it is desired to cause the press 10 to repeat a cycle quickly, the push buttons 31 and 32 can be released before the limit switch contacts 1LS open and be reclosed again after the limit switch contacts 1LS reclose. Release of the push buttons 31 and 32 before the contacts 1LS and 6LS open prevents set-up of the non-repeat circuit.

If either of the valves V1 or V2 should fail to operate and move to the open position, press 10 will not operate or will stop if either valve fails during a cycle of operation. If either of the valves V1 or V2 should remain in an open position when their respective windings V1W or V2W are de-energized, the switch contacts V1a or V1b associated with the malfunctioned valve will remain open and prevent pickup of relay 3R. If relay 3R does not pick up, the winding 4RW will not become energized through the contacts 3Re and the windings V1W and V2W would not be energized. Therefore in spite of the fact that one of the valves V1 or V2 is in the open position, the press will not operate because of the pneumatic series connection of the valves V1 and V2.

While certain preferred embodiments of the invention have been specifically disclosed, it is understood that the invention is not limited thereto, as many variations will be readily apparent to those skilled in the art and the invention is to be given its broadest possible interpretation within the following claims.

What is claimed is:

1. An electric control system for a power-driven machine operative to start a cycle of operation upon energization of an electroresponsive device and to stop the cycle of operation upon deenergization of the electroresponsive device, said system comprising:
   (a) a plurality of electromagnetic relays each having a plurality of contacts including a pair of normally closed contacts and a pair of normally open contacts and an operating winding and each being operable to pick-up for opening the normally closed contacts and closing the normally open contacts upon energization of its associated operating winding and to drop-out upon deenergization of its associated operating winding.
   (b) a switch having a plurality of contacts and manually movable from a released to an operated position, and
   (c) means connecting said device and switch contacts and said operating windings in a switching network,
   (d) said network including:
      (1) means for energizing said operating windings in a predetermined sequence,
      (2) a main energizing circuit including at least one contact of each relay and operative upon movement of said switch to its operated position and provided all of said relays have previously picked up as a result of said sequential energization of their respective operating windings to effect energization of said device,
      (3) holding circuit means arranged to be completed upon energization of said device for maintaining said device energized after movement of said switch to its released position,
      (4) means for effecting deenergization of said relay windings and said device, and
      (5) circuit means interconnecting a pair of normally closed contacts of each relay in said network in a manner to prevent recompletion of said main energizing circuit by movement of said switch to its operated position if all of said relays drop out during or immediately after a previous period of energization of said device.

2. An electric control system for a power-driven machine operative to start a cycle of operation upon energization of an electroresponsive device and to stop the cycle of operation upon deenergization of the electroresponsive device, said system comprising:
   (a) a switch normally in its released position and movable therefrom to an operated position, (b) a first means including an electromagnetic relay having an operating winding arranged to pick up a pair of contacts when electric power is applied to the system, (c) a second means including an electromagnetic relay having an operating winding arranged to pick up a plurality of pairs of contacts consequent upon pick-up of a first of said pair of contacts of the first relay, (d) a third means including an electromagnetic relay having an operating winding arranged to pick up a pair of contacts consequent upon pick-up of a first of said pairs of contacts of the second relay, (e) means causing the first relay to drop out upon movement of the switch to its operated position after said pick-up of the contacts of said third relay, (f) a fourth relay having an operating winding arranged to pick a pair of contacts up upon said drop-out of the first relay, (g) means causing the second relay to drop out upon said pick-up of the contacts of the fourth relay, (h) circuit means including a first of said pair of contacts of the fourth relay and a second of said pair of contacts of the second relay operative upon pick-up of said fourth relay and drop-out of the second relay to effect energization of the electroresponsive device to render the machine operative to restart a cycle of operation, (i) and means operated by the machine during the cycle of operation of the machine to deenergize the electroresponsive device thereby to cause the machine to stop.

3. An electric control system for a power-driven machine operative to start a cycle of operation upon energization of an electroresponsive device and to stop the cycle of operation upon deenergization of the electroresponsive device, said system comprising:

(a) first, second, third, and fourth electromagnetic relays each having a plurality of switching contacts, (b) a switch movable manually from a released to an operated position, (c) a limit switch driven by the machine, (d) means for applying electric power to the system, (e) means including contacts on the manually operated switch for causing said first relay to pick up when electric power is applied to the system and the switch is in the released position, (f) means including contacts on said first relay operative to cause said second relay to pick up consequent upon pick-up of said first relay, (g) means including contacts on said second relay operative to cause said third relay to pick up consequent upon pick-up of said second relay, (h) said contacts on said manually operated switch being arranged for causing said first relay to drop out upon movement of said switch to said operated position, (i) means including second contacts on said first relay operative to cause said fourth relay to pick up upon drop out of said first relay, (j) means including contacts on the fourth relay operative to cause said second relay to drop out upon pick-up of said fourth relay, (k) means including second contacts on the second relay operative while the first relay is dropped and the fourth relay is picked up to effect energization of the electroresponsive device, thereby to render said machine operative to start a cycle of operation, and (l) means including contacts on said limit switch operative during operation of the machine to deenergize the electroresponsive device thereby to stop the machine.

4. An electric control system in accordance with claim 3 characterized in that said limit switch has contacts operative to open and reclose during the cycle of operation of the machine to cause drop-out and subsequent pick-up of the third relay, said third relay having second contacts which open upon drop-out of the third relay to prevent pick-up of the first relay.

5. In an electric control system for a power-driven machine operative to start a cycle of operation upon energization of an electroresponsive device and to stop the cycle of operation upon deenergization of the electroresponsive device, such system comprising:

(a) first and second electromagnetic relays each having normally closed contacts, (b) third and fourth electromagnetic relays each having normally open contacts, (c) a manually operated switch having normally open contacts, which close upon operation of the switch, (d) an energizing circuit for the electroresponsive device including the contacts of the switch, the said normally closed contacts and the said normally open contacts connected in series, (e) means causing said normally closed contacts of said first and second relays to open and then reclose and the normally open contacts of said third and fourth relays to close upon operation of said switch, (g) a normally open limit switch contact closed by the machine during operation of the machine, and (h) a by-pass circuit around the contacts in said energizing circuit, said by-pass circuit including said limit switch contacts.

6. The combination as recited in claim 1 wherein the operation of the machine is controlled by a pair of electroresponsive devices which are connected pneumatically in series and have operating windings connected in parallel with each other in the main energizing circuit and have contacts connected in the switching network for preventing energization of said devices in event either of said devices fail to drop out after being picked up.

References Cited by the Examiner

UNITED STATES PATENTS

| | | | |
|---|---|---|---|
| 2,848,087 | 8/1958 | Simson et al. | 192—144 |
| 2,870,392 | 1/1959 | Eck et al. | 318—470 |
| 2,959,263 | 11/1960 | Simson | 192—129 |
| 3,135,289 | 6/1964 | Jordan | 137—596.16 |

SAMUEL BERNSTEIN, *Primary Examiner.*

J. A. SILVERMAN, *Assistant Examiner.*